United States Patent
Boots (10) Patent No.: US 6,854,238 B2
(45) Date of Patent: Feb. 15, 2005

(54) STRUCTURAL CONNECTION SYSTEM FOR FRAMEWORKS

(76) Inventor: Alfred Boots, 1113 S. Oak Park, Oak Park, IL (US) 60304

( * ) Notice: Subject to any disclaimer, the term of this patent is extended or adjusted under 35 U.S.C. 154(b) by 40 days.

(21) Appl. No.: 10/293,755

(22) Filed: Nov. 12, 2002

(65) Prior Publication Data

US 2004/0088941 A1 May 13, 2004

(51) Int. Cl.[7] .............................................. E04H 12/06
(52) U.S. Cl. ...................... 52/655.1; 52/81.3; 52/656.9; 403/176
(58) Field of Search .............................. 52/655.1, 81.3, 52/656.9; 403/169, 170, 217, 218, 219, 171, 176, 206

(56) References Cited

U.S. PATENT DOCUMENTS

| | | | |
|---|---|---|---|
| 1,471,520 A | | 10/1923 | McCloy |
| 2,001,215 A | | 5/1935 | Ruppel |
| 3,002,590 A | | 10/1961 | Hannoosh et al. |
| 3,890,022 A | * | 6/1975 | Moon .......................... 312/140 |
| 3,912,410 A | | 10/1975 | Pofferi |
| 3,982,841 A | | 9/1976 | Endzweig |
| 4,012,153 A | * | 3/1977 | Pidgeon et al. ............. 403/170 |
| 4,313,687 A | | 2/1982 | Martinez Apeztegui et al. |
| 4,322,176 A | | 3/1982 | Johnson, Jr. |
| 4,340,318 A | | 7/1982 | Bush et al. |
| 4,355,918 A | | 10/1982 | Van Vliet |
| 4,379,649 A | | 4/1983 | Phillips |
| 4,438,615 A | | 3/1984 | Wendel |
| 4,505,609 A | | 3/1985 | Vella |
| 4,633,566 A | * | 1/1987 | Coppa .......................... 29/429 |
| 4,637,193 A | | 1/1987 | Lange |
| 4,640,572 A | * | 2/1987 | Conlon ........................ 439/892 |
| 4,648,734 A | | 3/1987 | Daus, Jr. et al. |
| 4,677,804 A | | 7/1987 | Holt |
| 4,766,712 A | * | 8/1988 | Hale ............................ 52/645 |
| 4,822,199 A | | 4/1989 | Nehls |
| 4,864,795 A | | 9/1989 | Burg |
| 4,867,596 A | | 9/1989 | Ocuin |
| 4,915,532 A | | 4/1990 | Radclyffe |
| 4,923,322 A | | 5/1990 | Burg |
| 4,932,808 A | | 6/1990 | Bar et al. |
| 5,051,019 A | | 9/1991 | Kohl |

(List continued on next page.)

OTHER PUBLICATIONS

Guard Rails, Hand Rails and Structural Fittings from McMaster–Carr, Catalog 101, pp. 876–879.
Kee Klamp Slip–on Pipe Fittings and Modular Storage Decking in catalog from Material Flow, Inc., Chicago, Illinois.
PCT International Search Report dated Mar. 3, 2003.

Primary Examiner—Brian E. Glessner
Assistant Examiner—Basil Katcheves
(74) Attorney, Agent, or Firm—Bell Boyd & Lloyd LLC (57) ABSTRACT

The present invention provides a modular frameworking system having various apparatuses and methods of attaching same. A framework built according to the present invention includes a plurality of hubs or nodes, each hub including a plurality of pairs of opposing flat faces. Each face can connect to at least one connector. The present invention includes primary "T" shaped connectors that attach directly to the hubs and secondary "L" shaped connectors that attach to the primary connectors and thus the hub. An adapter is provided and connects at one end to a leg of the connector and at the other end to a structural member, e.g., a straight or curved tube, angle or channel. The adapter and structural member are readily removable from the hub and the connector. The connector can be curved and alternatively includes a hinge so that the connector can rotate. The connectors can attach to each face of the hub and can be rotated in multiple directions on any given face of the hub.

37 Claims, 11 Drawing Sheets

U.S. PATENT DOCUMENTS

| | | | |
|---|---|---|---|
| 5,095,677 A | * 3/1992 | Godbout et al. | 52/655.2 |
| 5,116,160 A | * 5/1992 | Pold et al. | 403/172 |
| 5,125,206 A | 6/1992 | Motohashi et al. | |
| 5,127,758 A | 7/1992 | Kreusel | |
| 5,165,207 A | 11/1992 | Oehlke | |
| 5,310,273 A | 5/1994 | Hara | |
| 5,356,234 A | 10/1994 | Vangool | |
| 5,568,993 A | 10/1996 | Potzick | |
| 5,580,181 A | * 12/1996 | Nomura | 403/170 |
| 5,640,811 A | 6/1997 | Boyle et al. | |
| 5,651,630 A | 7/1997 | Nomura | |
| 5,700,102 A | 12/1997 | Feleppa | |
| 5,904,437 A | 5/1999 | Allen | |
| 6,082,837 A | * 7/2000 | Battochio et al. | 312/140 |

\* cited by examiner

STRUCTURAL CONNECTION SYSTEM FOR FRAMEWORKS

BACKGROUND OF THE INVENTION

The present invention relates to structural systems. More particularly, the present invention relates to modular systems for the construction of frameworks.

Certain permanent and semi-permanent free-standing frame members require systems that can be readily assembled and disassembled. The frame members are required to provide a durable and stable structure, be easy to handle and be installable by a limited number of persons. The frame members can form a wide variety of shelter frames such as outdoor tents, circus tents, playground equipment, geodesic domes, greenhouses, swimming pool structures, etc. The frame members can also form internal structures, such as furniture, stands, shelving, artwork, etc.

One problem with many adjustable framing systems is that they use telescoping members to assemble and disassemble a structure. The telescoping members are costly, complicated and tend to make the structure less rigid or strong. Some systems, for instance, require inner and outer spring loaded tubes and a bolt or clamp that tightens the members together to form a member having a desired length. Other systems require an internal threaded rod or ball screw and an internally threaded member that threads onto the ball screw. When the threaded member is turned, the length of the member shortens or lengthens. Still other systems require a plurality of internal rods having threaded ends connected by a right angle gear and a second mating gear that couples to a handle, which extends outside of the member to enable an operator to turn the handle and thereby turn the rods to lengthen or shorten the member.

Obviously, each of the above adjustable framing systems is more complicated, costly, and heavy than simply using non-adjustable sections of tube and standard, nonadjustable tube fittings, which form a system that is difficult to assemble and disassemble. In order to put together and take apart the above systems, the members need to be adjustable. A need therefore exists for a framing system that allows a structure to be assembled and disassembled without having to telescopically move a tubing member, i.e., shorten or lengthen, the member along its centerline. The system should optimally take advantage of the relatively low cost and structural stability provided by off the shelf tubing.

There are known framing systems for releasably interconnecting frames that do not require telescoping. These systems have typically used screw connectors or quick disconnects, which have a number of drawbacks. First, in some systems the connectors or quick disconnects are formed integrally as part of the frame member. Here, the length of the frame members must be carefully machined, which adds to the expense of manufacture. Second, the integral connectors often require more than one person for assembly. Third, many of the connectors are limited to providing only right-angle connections. Such connectors obviously limit the shape and flexibility of the resulting structures.

A need therefore further exists for a non-telescoping framing system that has non-integral connectors, which do not require precise and expensive machining and tolerances. Further, the system should allow for members to be connected at multiple angles and for curved members.

SUMMARY OF THE INVENTION

The present invention provides an improved modular system for constructing a frame, including an apparatus and method of assembling same. More specifically, the improved system allows structural tubing to be assembled and disassembled in a direction perpendicular to a centerline of the tubing without having to move the tubing along its centerline. The improved structural system includes features and components that allow the structural tubing to be positioned at various angles. The system also enables curved tubing to be used. The present invention therefore provides a flexible, easy to use, light-weight, low-cost and sturdy system that can be used to construct a multitude of different frames, such as industrial and architectural railings, fencing, shelter frames for outdoor tents, circus tents, playground equipment, geodesic domes, greenhouses, store displays, swimming pool structures, artwork, etc. The frame members can also form internal structures such as furniture, stand and shelving.

In one preferred embodiment, the structural tubing system includes a hub and at least one connector that removably couples to the hub. The hub includes a plurality of pairs of opposing, substantially flat faces. For example, the hub in an embodiment is a cube. The connector has a flange that connects to one of the faces of the hub and a leg that connects to a structural member. An adapter is provided that couples the leg of the connector to the structural member. The structural member can be any one of: a round tube, a rectangular tube, a beam, a channel and a formed member. Different types of structural members can be connected to different faces of the hub. Furthermore, one or more of the members connected to faces can be curved. Still further, one or more of the connectors can be curved so that a straight or curved structural member extends from the hub at a desired angle.

In an embodiment, the connector is "T" shaped, wherein the top of the "T" forms the flange that couples to the hub. The leg of the "T" is the leg of the connector that couples to the adapter, the adapter fitting into or coupling to the structural member. In an embodiment, the connector bolts to the hub. In an embodiment, the flange bolts to the leg of the connector. In this way, multiple connectors are removably connectable to the hub, so that virtually any type of framing shape can emanate from the hub. That is, the adapter is removable from the connector, wherein the connector remains connected to the hub. The hub, connector and adapter may be modified in a variety of ways as described below to create specialized fittings for specific application, e.g., for curved tubing assemblies or portions of assemblies. An operator can translate the adapter and structural member away from the remainder of the frame in a direction perpendicular to the centerline of the connector, adapter and tube. A single operator can therefore construct a structure or frame using the modular system of the present invention.

The structures of the present invention can be rectilinear or curvilinear and have cross-bracing in multiple rectilinear and diagonal planes. The structural members or tubing may be aluminum, steel, stainless steel (e.g., for underwater applications), wood or plastic. The members may be of various sizes, e.g., ¾ inch to 4 inches (2 cm to 10.2 cm). The adapters and structural members can be held together by screws and welding for metal and plastic and by dowels, biscuits and glue for wood.

One primary advantage of the present invention is that the component parts are interchangeable and can be used in various different ways. For example, the flange is configured and arranged, as is the hub, so that the flange may be oriented on the hub in a multitude of rotational directions and so that the connectors can attach to multiple faces of the hub. In an embodiment, a cubical hub includes two pairs of side faces and a pair of top and bottom faces. The side pairs have different mounting hole arrangements. The mounting hole arrangement of the top and bottom faces also differs from the side pairs of faces.

It should be appreciated that when the hub includes six faces, the hub can connect to six different connectors and thus at least six different structural members. The present invention also includes secondary connectors that attach to the primary "T" shaped connectors. In an embodiment, the secondary connectors are "L" shaped, wherein the bottom section of the "L" is a flange having the same mounting hole patterns as a portion of the flange of the "T" connector. The "L" shaped connectors allow multiple structural members to extend from a single face.

In an embodiment, two "L" shaped flanges can connect, through the "T" shaped flange, to a face of the hub. Each of the "L" shaped flanges includes a leg, similar to the leg on the primary "T" shaped connector that connects to an adapter, and via the adapter, to a structural member. Thus, in an embodiment, up to three structural members can extend from a single face of the flange. Certain of these members can be used for cross-bracing. One or more of the "T" shaped and "L" shaped connectors can also include a hinge, so that the leg of the connector and thus the structured member can rotate with respect to the flange of the connector and thus the hub.

The present invention also includes a cross-brace member that attaches to and extends perpendicularly from the leg of one of the connectors, e.g., a primary "T" shaped connector or a secondary "L" shaped connector. That is, if the connector extends straight out from the hub, the cross-brace member extends perpendicularly up or down from the connector. The cross-brace members enable additional structural members to be used as cross-braces that strengthen and stiffen the resulting frame.

The cross-brace member defines a notch in an embodiment, wherein the notch of the member extends around the leg of the connector, when the connector and cross-brace member are attached, so that the cross-brace member does not rotate with respect to the connector. The adapter in an embodiment also defines a notch so that the adapter can fit around or clear the cross-brace member when the adapter is connected to the connector.

It is therefore an advantage of the present invention to provide a frameworking system that is easy to use.

Further, it is an advantage of the present invention to provide a frameworking system that does not require telescoping members.

Moreover, it is an advantage of the present invention to provide a frameworking system that is readily assembled and disassembled.

It is another advantage of the present invention to provide a frameworking system that is light-weight.

It is a further advantage of the present invention to provide a frameworking system that is adaptable to be made of many different types of materials.

It is still another advantage of the present invention to provide a frameworking system that is low-cost.

It is still a further advantage of the present invention to provide a frameworking system that is sturdy.

Still further, it is an advantage of the present invention to provide a frameworking system that may be used to construct a variety of two dimensional, three dimensional, rectangular and curved frameworks.

Additional features and advantages of the present invention are described in, and will be apparent from, the following Detailed Description of the Invention and the figures.

DETAILED DESCRIPTION OF THE INVENTION

Figure 1:
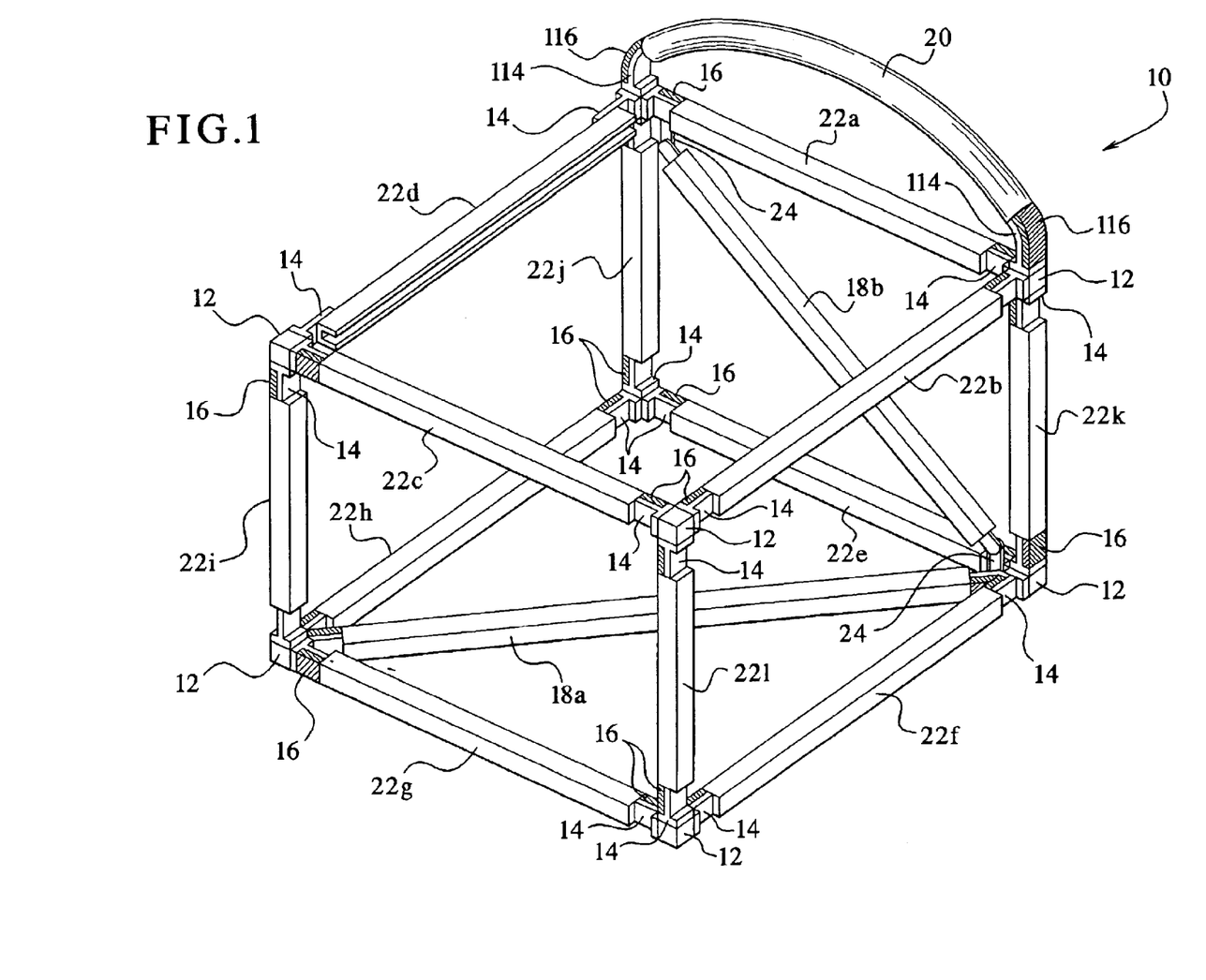
FIG. 1 is a perspective view of a frame assembled via the system, apparatus and method of the present invention illustrating the hubs, primary and secondary connectors, adapters, cross-brace members, and the horizontal, vertical, diagonal and curved structural members of the present invention.

Referring now to the drawings and in particular to FIG. 1, a structure 10 made by the system of the present invention is illustrated. Structure 10 is one of a virtually infinite number of structures that can be made using the components of the system of the present invention. Structure 10, however, illustrates many of the basic components and also many of the variations of the present invention. As illustrated, structure 10 includes a number of right-angle straight pieces, a number of angled cross-braces, and a curved member. Each of these members connect to the structure 10 using the various connection components discussed below.

The core or base piece that connects any two members is the hub 12. Each of the corners of the structure 10 includes a hub 12. Because the view is a perspective one, some of the hubs 12 are hidden behind other components that are further in the foreground. The hubs 12, in one preferred embodiment, include at least two opposing substantially parallel faces. In one implementation, the hub 12 has a cubicle shape.

Each face of the hub 12 is connectable to a connector 14. In the illustrated structure 10, each hub connects to three connectors 14. Where the hub 12 has six faces, the hub 12 can connect to at least six connectors 14. In the illustrated structure 10, the connectors 14 are substantially "T" shaped.

As illustrated further below, "L" shaped connectors can mount on top of a "T" shaped connector 14 to the hub 12. The base of the "L" shaped connector attaches to the top of the "T" shaped connector. Although difficult to see in FIG. 1, the angled cross-brace 18a shown along the bottom of structure 10 attaches to respective hubs 12 via "L" shaped connectors that in turn attach to "T" shaped connectors, which are connected directly to a face of the hubs 12.

The connectors of the present invention can be curved. Curved connectors 114 are illustrated at the top and back of structure 10, attached to a curved member 20. The curved connectors 114 do not have to connect to a curved member 20 and can alternatively connect to a straight member. As illustrated in more detail below, the connectors 14 and 114 attach to the hubs 12 using bolts and tapped holes in one preferred embodiment.

The connectors 14 or 114 attach to the curved or straight members via adapters 16 and 116, respectively. The adapters 16 bolt or otherwise connect to the connectors 14 and also bolt or otherwise connect to a straight member or a curved member, such as curved member 20. As illustrated by the structure 10, the adapters 16 attach to straight horizontal members such as members 22a through 22h. The adapters 16 also connect to straight vertical members such as members 22i through 22l. The adapters 16 further connect to the cross-braces, such as members 18a and 18b. The curved adapter 116 attaches in an embodiment to the curved member 20. The curved adapters 116, however, could alternatively attach to straight members such as one of the members 22 (member 22 collectively refers to individual members 22a through 22l).

The adapters 16 are removable from the connectors 14, so that any of the members 22 or the cross-braces 18 (cross-brace member 18 refers collectively to cross-brace members 18a and 18b) can be removed without having to remove the connector 14 from the hub 12 or without having to telescopically shorten one of the members 22 or cross-braces 18. In this manner, structure 10 is a sturdy yet flexible structure, which can be readily assembled and disassembled.

A cross-brace member 24 can be attached between any of the connectors 14 and the adapters 16. The cross-brace members 24 extend perpendicularly from the coupled connectors 14 and adapters 16. The cross-brace members 24 provide a surface area onto which to mount a cross-brace 18. As with the horizontal and vertical members 22, the cross-braces 18 can be removed from the cross-brace members 24 readily and without having to remove the connectors 14 and without having to shorten telescopically the cross-braces 18. The straight vertical and horizontal members 22, the curved members 20 and the cross-braces 18 may each be of a variety of different shapes and configurations.

Most of the members 22 and the cross-braces 18 of the structure 10 are illustrated as being a square or rectangular beam. Member 22d is illustrated as being a "C" channel. In an alternative embodiment, one or more of the members 22 or cross-braces 18 can be an "L" shaped channel, etc. The curved member 20 is illustrated as being a rounded tube. Any of the members 22 and the cross-braces 18 can also be a rounded tube.

Each of the components of the present invention may be made of a variety of materials, such as metal, wood or plastic. If metal, the components can be steel, stainless steel, aluminum, brass or any other type of suitable metal or alloy thereof. Polymer structures can be made of, for example, polyvinylchloride ("PVC"), polyurethane, polypropylene, etc. If metal, the structure 10 in an embodiment uses metal screws or bolts. If wood, the structure 10 uses dowels and biscuits. If plastic, the structure 10 uses bolts and nuts and, in a preferred embodiment, does not use threaded plastic.

Figure 2:
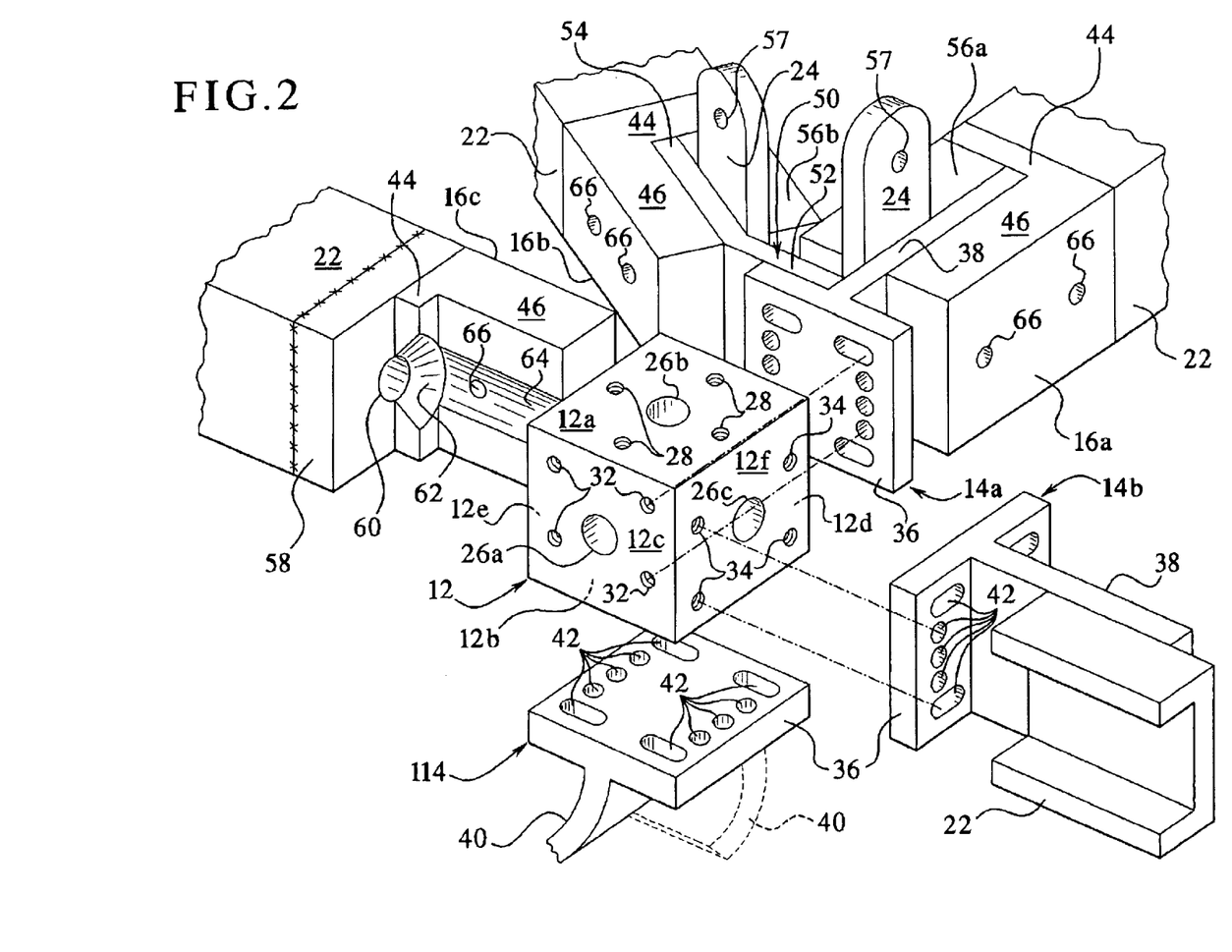
FIG. 2 is an exploded perspective view of the present invention illustrating a hub, primary connectors, adapters and various structural members attached to the hub.

Referring now to FIG. 2, one of the intersections of the structure 10 is illustrated in more detail. FIG. 2 illustrates a hub 12, which is substantially cubical in shape. Hub 12 includes opposing parallel top and bottom faces 12a and 12b, respectively, front and rear faces 12c and 12d, respectively, and left and right faces 12e and 12f, respectively. Hub 12 includes knock out bores 26a, 26b and 26c, which are provided for the purpose of lightening hub 12. Further, knock out bores 26a, 26b and 26c provide for a more economical hub, without reducing the strength of the hub significantly.

The present invention is designed such that each of the components may be used in a variety of different ways. That is, the connectors 14 that attach to the hubs 12 are manufactured so that they may be rotated and mounted in multiple directions with respect to any given face of the hub 12 and so that they may be mounted to any one of the faces of the hub 12. The top and bottom faces 12a and 12b of the hub 12 form a diamond-shaped pattern of mounting holes 28. Mounting holes 28 in an embodiment are blind-tapped holes that extend for a predetermined distance downwardly or upwardly, as the case may be, into the hub 12.

The opposing faces 12c and 12d each define a rectangular hole pattern, which includes four box-shaped mounting holes 32. Mounting holes 32 are likewise blind-tapped holes. Faces 12e and 12f also include mounting holes 34 in a rectangular hole pattern, which are provided along different centerlines than are the holes 32. Holes 34 are likewise tapped and blind. In an alternative embodiment, holes 28, 32 and 34 may be through holes, wherein a bolt inserts through a connector, through one of the through holes 28, 32 or 34 of the hub, and wherein a nut is placed on a portion of the bolt that extends through the hub 12.

FIG. 2 illustrates that "T" shaped connectors 14a and 14b mount to the faces 12d and 12f, respectively. It should also be appreciated that a "T" shaped connector 14 also mounts to the face 12e; however, the connector is not illustrated so that the corresponding adapter 16c may be illustrated in detail. A curved connector 114 mounts to the bottom face 12b of cube 12. A phantom leg 40 is also shown on the curved connector 114 to illustrate that the connector could alternatively be rotated 90 degrees, so that the curvature of leg 40 extends outward from the face 12c rather than outward from the face 12e as is the case with curved leg 40 shown in solid.

Each of the "T" shaped connectors 14 (collectively referring to connectors 14a and 14b) and the curved connector 114 include a flange 36 and a leg. The straight connectors 14 include a straight leg 38. The curved connector 114 includes a curved leg 40. The flange 36 is the portion of the connector 14 or 114 that mounts to one of the faces of the hub 12. Flange 36 defines mounting holes 42. In particular, the illustrated embodiment includes clearance holes 42 on either side of the straight leg 38 or curved leg 40. The clearance holes 42 are sized appropriately according to the size of the tapped holes 28, 32 and 34. Threaded holes 28, 32 and 34 may be sized differently, for example, the top and bottom mounting holes 28 can be of a different size than the side-mounting holes 32 and 34.

The five clearance holes 42 are positioned in the flange 36 of the connector 14 so that flange 36 can mount to any face of the hub 12, and in any orientation upon any face. For example, centerlines emanating from the mounting holes 34 of the face 12f intersect the second and fifth holes from the top on the flange 36 of the connector 14b when the connector 14b is aligned with the hub 12. The centerlines emanating from the mounting holes 32 on faces 12c and 12d align with the first and fourth holes from the top of the connector 14a. The outer holes or apertures 42 in flange 36 are slotted so that when connector 14 is rotated 90° with respect to a face of the hub, the inner portion of the slotted apertures 42 aligns with the mounting holes 32 or 34 having a different hole pattern than the holes of the hub before rotation. Flanges 36 of connectors 14 can mount to any of the side faces 12d to 12f (clockwise about cubical hub 12). The flange 36 of the curved connector 114 also shows that the middle holes 42 in the flange 36 align with the mounting holes 28 on the top and bottom faces 12a or face 12b, respectively, regardless of which orientation of the curved leg 40 is positioned with respect to the hub 12.

Connector 14b mounts directly to a "C" channel 22. In this case, an adapter 16 is not required because the "C" channel 22 mounts, in a sturdy fashion directly to the leg 38 of the connector 14b. The mounting holes are provided on the leg 38 offset slightly from the flange 36, so that "C" channel 22 clears the bolts (not illustrated) that hold the connector 14b onto the hub 12.

Connector 14a has a plurality of members 22 emanating therefrom. The members 22 are illustrated as square tubing and require the use of the adapters 16a and 16b (collectively referred to as adapters 16). The adapters 16 include a tube mounting portion 44 that provides a mechanism to which a round or square tube member 22 can readily and sturdily attach. The adapters 16 also include a connector mounting portion 46, which extends from the tube mounting portion 44 and provides a surface that abuts the surface of the leg 38 of the connector 14, 50 that the adapter 16 can mount to the connector 14.

Adapter 16a mounts to the leg 38 of connector 14a in such a way that a space is left between the adapter 16a and the flange 36 of the connector 14a. Within this space, a secondary or "L" shaped connector 50 can mount to the flange 36 of the primary or "T" shaped connector. The "L" shaped connector also includes a flange 52 and a leg 54. The flange 52 includes the same holes 42 having the same spacing as does the flange 36 of the primary connector 14. In this manner, the "L" shaped connectors align with, are rotatable with, and are mountable in any orientation to any surface of the hub 12 as is the case with the primary connectors 14. The leg 54 of the "L" shaped connector 50 also includes the same mounting holes as does the leg 38 of the "T" shaped connectors 14. It should therefore be appreciated that three legs of three different connectors can emanate in three different directions from the any given face of the hub 12. As illustrated, two members 22 emanate from face 12d of the hub 12.

A backing 56a is provided on the opposite side of the leg 38 of the connector 14a from the adapter 16a. Backing 56a provides mounting rigidity and strength to the overall system and also makes the contour of the member 22 extending from the hub 12 substantially uniform, rather than notch-shaped.

The backing 56a itself includes a notch, which allows an associated cross-brace member 24 to extend perpendicularly from the leg 38 of the connector 14a. The cross-brace member 24 can extend in one direction or two directions from the leg 38. The cross-brace member 24 can therefore mount to one or two cross-braces 18 (see FIG. 1). The cross-brace member defines a hole 57 that enables cross-brace member 24 to mount to a cross-brace adapter, which is not illustrated but is similar to adapters 16, having a tube mounting portion that adapts to the shape of a tube or channel.

The "L" shaped connector 50 can alternatively mount directly to the hub 12. For example, if the leg 54 creates an angle with respect to the flange 52 of the "L" shaped member 50 of forty-five degrees, and it is desired to have two members extend forty-five degrees from the face of the hub 12, then two "L" shaped connectors 50 could be attached to the face, wherein no "T" shaped connector 14 is used.

The connector 14 is not shown in association with the face 12e of the hub 12, so that the inner-workings of the adapter 16 can be illustrated. The adapter 16c is sectioned along the tube mounting portion 44 to show one possible method of mounting the adapter 16 to a tube 22. Tube 22 has been welded to end cap 58. End cap 58 defines a threaded hole 60. The tube mounting portion 44 of the adapter 16 defines a chamfered mounting hole 62. Chamfered hole 62 allows a flathead screw to mount the adapter 16c to the endcap 58, which is welded to the tube 22. It should be appreciated from this illustration that adapter 16c could easily mount to a round tube having a round endcap welded thereto. The connector mounting portion 46 of the adapter 16c includes a rounded bore 64 that enables the flathead screw to be inserted through the chamfered hole 62. Mounting holes 66 made in the outer surface of the adapters 16 extend through the connector mounting portions 46 of the adapters and terminate at the rounded bore 64.

As illustrated by the adapters 16a and 16b, the adapters include a plurality of mounting holes 66, which are aligned with similar holes (not seen) in the leg 38 of the connectors 14a, 14b, the cross-brace members 24 and the backing 56a and 56b. In an embodiment, the holes in the backings 56a and 56b are tapped, wherein the holes in the adapters 16a, 16b, legs 38 and 54 and cross-brace members 24 are clearance holes. In alternative embodiments, one or more of the holes in the cross-brace member 24, leg 38 or adapter 16a could alternatively be tapped. Further alternatively, each of the holes in the various pieces could be clearance holes, wherein a bolt receives a nut to fasten the components together.

Figure 3A:
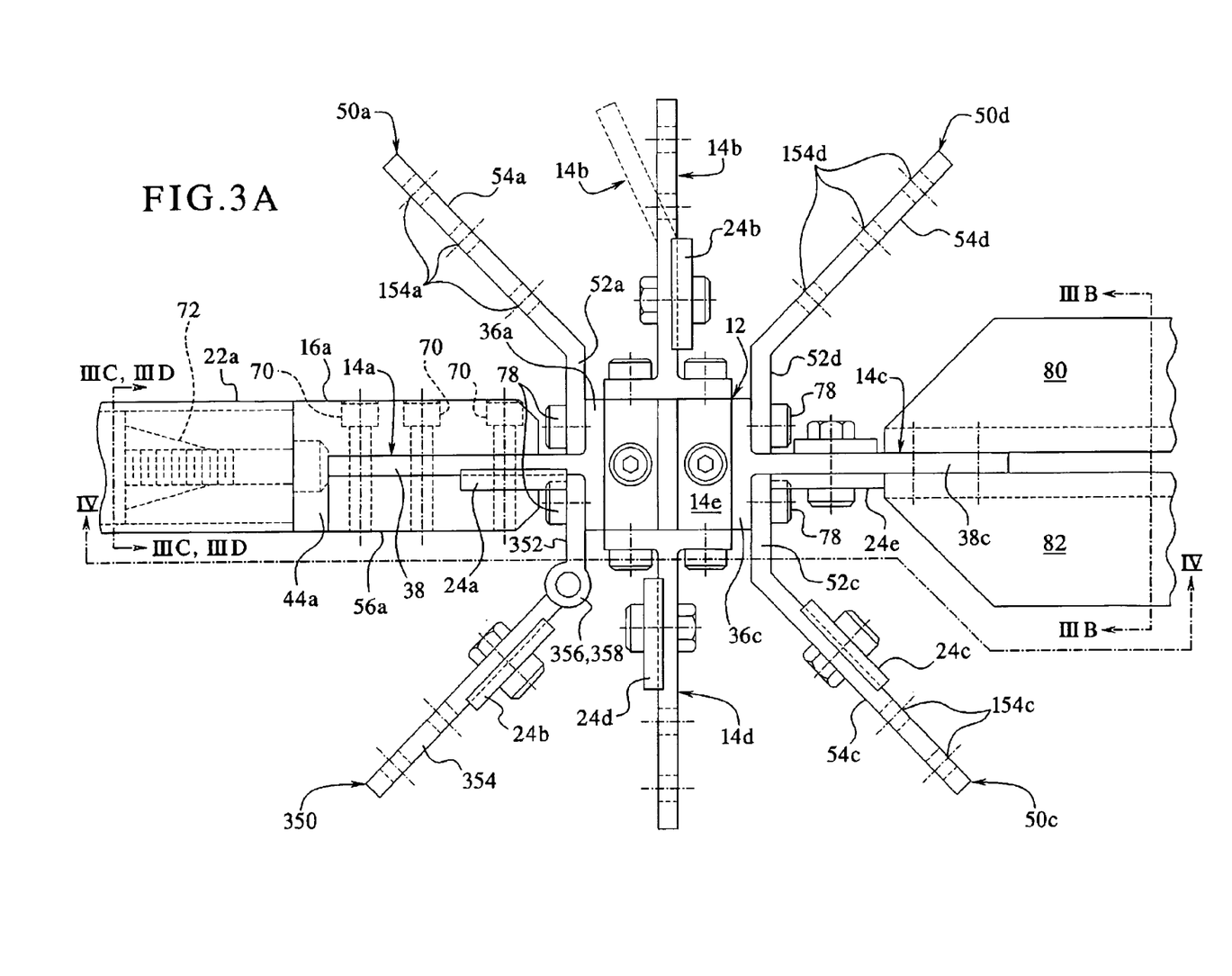
FIG. 3A is an elevation view of the present invention illustrating a hub, primary connectors, adapters and various structural members attached to the hub.

Referring now to FIG. 3A, a top view of an assembly of the present invention is illustrated. A hub 12 is provided. "T" shaped connectors 14a through 14e attach to the hub 12. Connector 14e extends from the top face of the hub 12, i.e., out of the page of FIG. 3A. "L" shaped connectors 50a and 350 attach via the flange 36a of the connector 14a to the hub 12. The "L" shaped connector 350 is rotatable and described in more detail below. The flange 352 and the leg 354 are rotatable about hinge 356, 358. A cross-brace member 24b is illustrated attached to the leg 354 of the rotatable "L" shaped flange 350. Cross-brace members 24a to 24e attach to legs of the various connectors in FIG. 3A. The cross-brace members 24a to 24e extend perpendicularly from the legs of the connectors, i.e., out of the page of FIG. 3A.

Adapter 16a attaches to the connector 14a with the aid of backing 56a. Countersunk holes 70 are shown in phantom as being made in the adapter 16a. Countersunk holes 70 allow screws to sit into the adapter 16a and thread into the backing 56a through clearance holes in the leg 38 of the connector 14a.

Figure 3B:
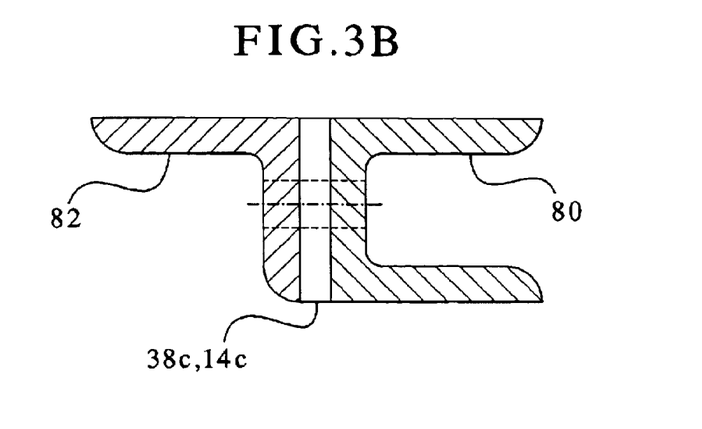
FIGS. 3B to 3D are sectioned elevation views taken along lines IIIB—IIIB, IIIC—IIIC and IIID—IIID, respectively, of FIG. 3A.
Figure 3C:
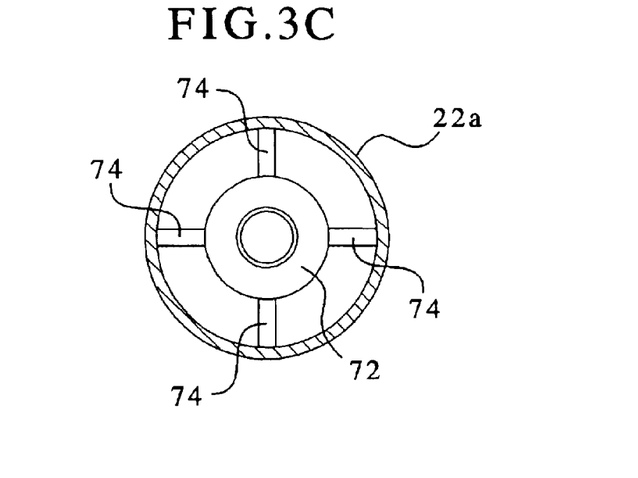
Figure 3D:
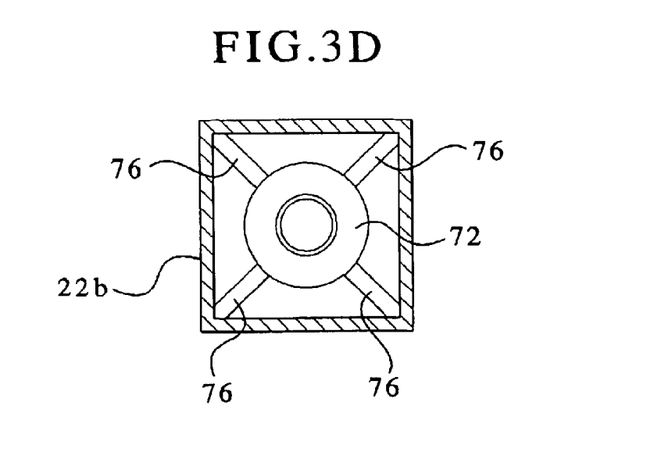

The tube mounting portion 44a of the adapter 16a also includes a countersunk hole that enables a screw to engage a threaded insert 72 held frictionally within tube member 22a. FIG. 3C is a sectioned view of tube member 22a taken along the line IIIC—IIIC, wherein the tube member 22a is round. The threaded insert 72 includes members 74 that catch the inner wall of the tube 22a and hold the threaded insert 72 in place. Threaded insert 72 is an alternative mounting apparatus to the welded end cap 58 illustrated in FIG. 2. Similarly, FIG. 3D is a sectioned view taken along line IIID—IIID, which shows a square tube 22b. Threaded insert 72 includes alternative members 76 that extend into the inside corners of the square tube 22b and thereby hold the insert 72 in place.

Connector 14b in FIG. 3A is illustrated alternatively in phantom showing a horizontally curved connector. The horizontally curved connector allows a tube, curved or straight member to emanate horizontally at a desired angle from a face of the hub 12.

"L" shaped connectors 50c and 50d connect to the flange 36c of the connector 14c, all three of which are attached to the hub 12 via bolts 78. "L" shaped connector 50c also connects to a cross-brace member 24c. Cross-brace member 24c can extend in one or two directions perpendicularly from the leg of the "L" shaped connector 50c.

Separate channels 80 and 82 mount to the leg of the connector 14c. FIG. 3B is a cross-section of the channels 80 and 82 taken along line IIIB—IIIB of FIG. 3A, which shows that the channel 80 is a "C" shaped channel, while the channel 82 is "L" shaped. Since the mounting holes of the channel 80 and the "L" channel 82 are in alignment, two separate channels can mount to the leg 38c of the connector 14c. As discussed above, the channels 80 and 82 mount directly to the connector 14c without the need for an adapter 16.

Figure 4:
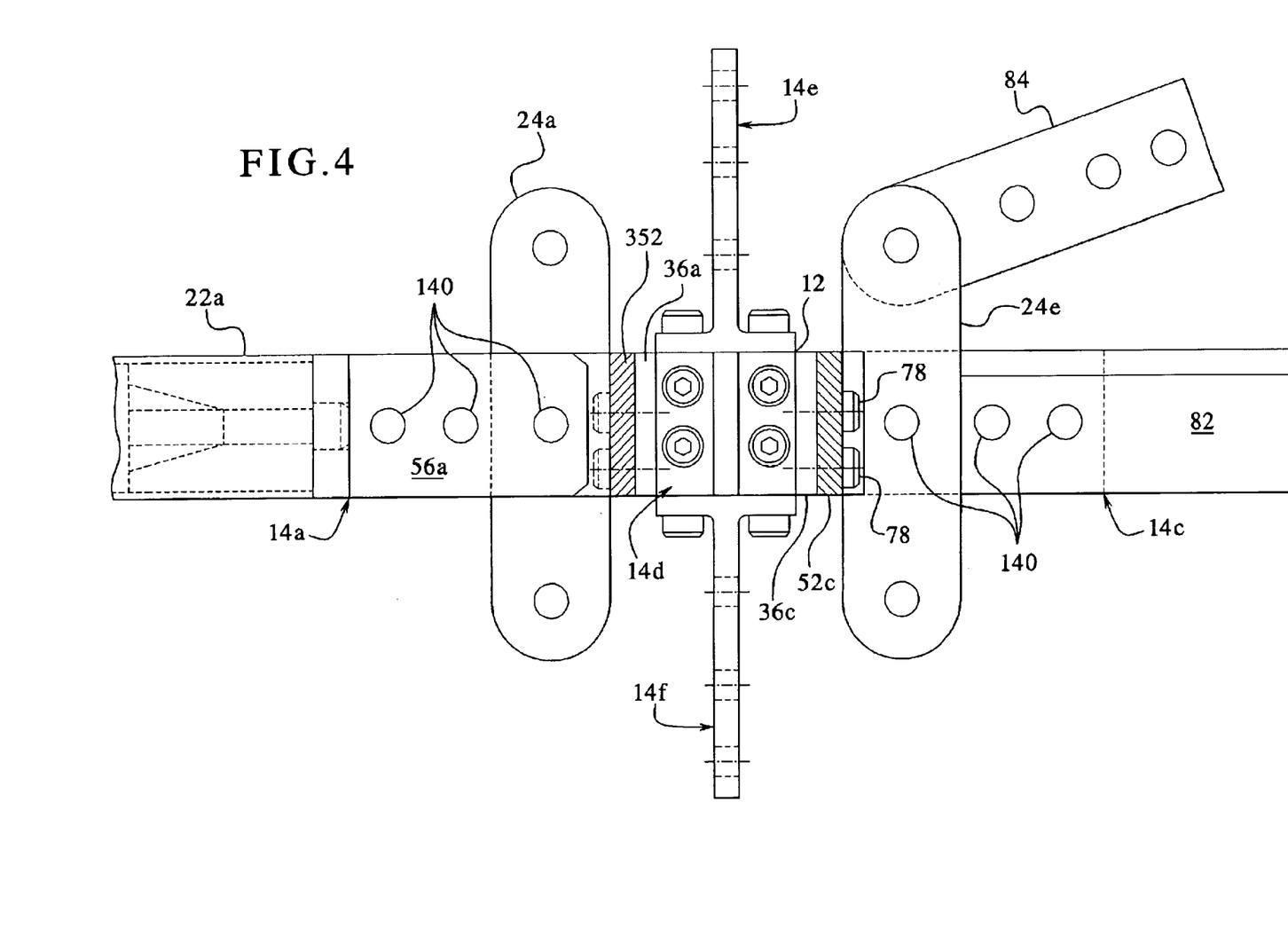
FIG. 4 is a sectioned elevation view taken along lines IV—IV of FIG. 3A.
Figure 5A:
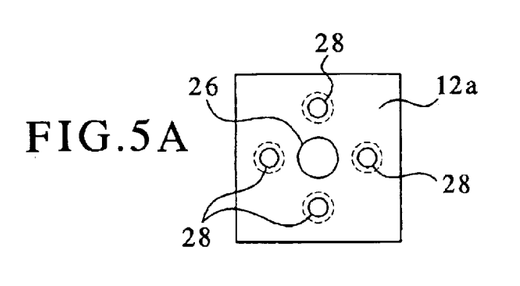
FIGS. 5A to 5F illustrate various views of one embodiment of a hub of the present invention.
Figure 5B:
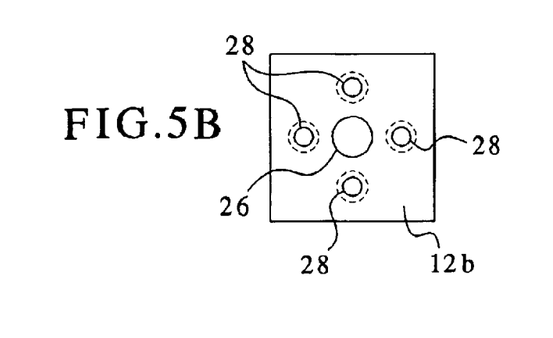
Figure 5C:
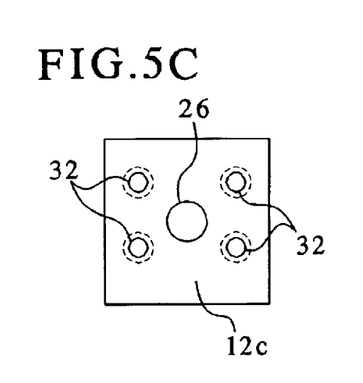
Figure 5D:
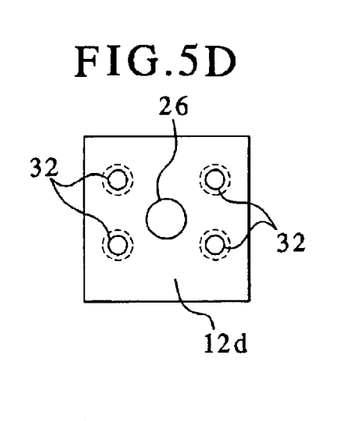
Figure 5E:
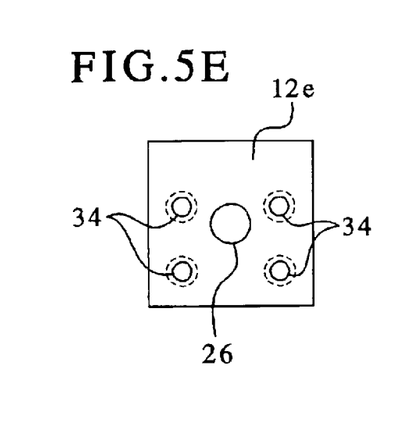
Figure 5F:
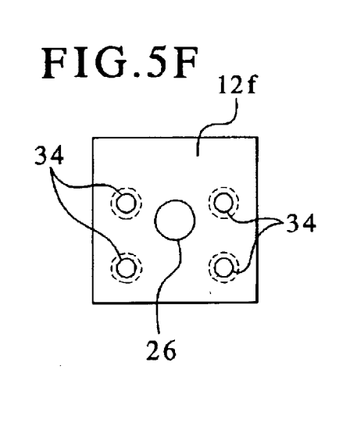

Referring now to FIG. 4, a view taken along line IV—IV of FIG. 3A is illustrated. FIG. 4 illustrates the assembly of FIG. 3A from the side. FIG. 4 illustrates the hub 12 of FIG. 3A. The flanges 36a and 352 of the connectors 14a and 350, respectively, are illustrated as connected to the left side of hub 12. A cross-brace member 24a mounts to the leg of the connector 14a and extends above and below the horizontally disposed connector 14a. Connector 14e extends upwardly from connector 14c. An additional connector 14f is illustrated as extending in a downwardly vertical direction from the hub 12. Holes 140 in the connectors 14a and 14c and the backing 56a illustrate one possible hole or mounting pattern.

Flanges 36c and 52c of the connectors 14c and 50c, respectively, mount to the right side of hub 12. A cross-brace member 24e mounts to the connector 14c, which extends above and below the horizontally disposed channel 82. A cross-brace adapter 84 rotatably mounts to the cross-brace member 24e. The cross-brace adapter 84 in turn mounts to a cross-brace, which can be a channel or a tube as discussed herein. The cross-brace (not illustrated) attached to the cross-brace adapter 84 can be assembled and rotated at any desired angle relative to the channel 82.

Referring now to FIGS. 5A to 5F, the faces 12a to 12f of the hub 12 are illustrated. The faces 12a to 12f correspond to faces 12a to 12f of the hub 12 shown in FIG. 2. Top face 12a and bottom face 12b include the mounting holes 28, which can be blind or through, tapped or clearance holes as desired. Front face 12c and back face 12d include mounting holes 32, which can again be blind or through, tapped or clearance holes. Side faces 12e and 12f include mounting holes 34, which can likewise be blind or through, tapped holes or through holes. FIG. 5 illustrates that faces 12e and 12f include holes 34 along the same centerlines, while faces 12c and 12d include holes 32 along the same centerlines.

Holes 12e and 12f and 12c and 12d are alternatively through holes having the same respective single centerlines. The offset nature of the holes in faces 12c through 12f enable through holes to be used. Further, faces 12a and 12b include separate holes 28 along the same centerlines or are through holes having the same centerline. As alluded to before, the hub 12 can employ weight-reducing bores 26.

Figure 6A:
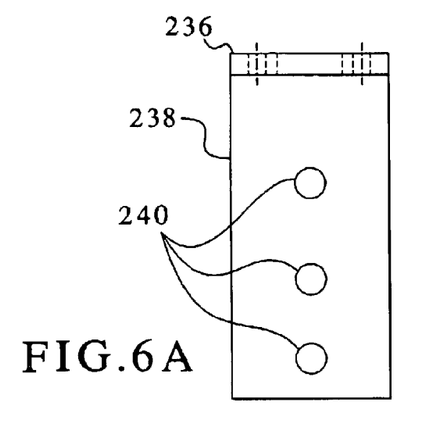
FIGS. 6A to 6C illustrate various views of an alternative embodiment of the primary connector of the present invention from the connector illustrated in FIG. 2.
Figure 6B:
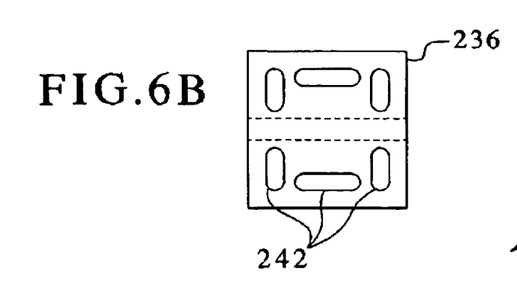
Figure 6C:
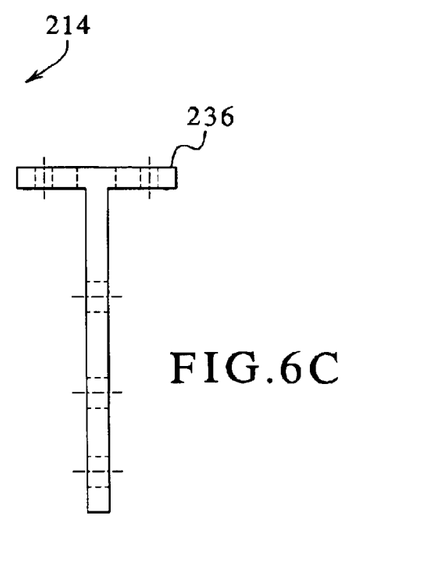

Referring now to FIGS. 6A to 6C, an alternative connector 214 is illustrated. Instead of the five apertures 42 made in the flange 36 of the connector 14, the alternative connector 214 includes an alternative flange 236 that employs three slots 242 instead of two slots and three holes as illustrated with the connectors 14 of FIG. 2. The alternative connector 214 operates in substantially the same manner as the connector 14 described above. The face of the flange 236 can be mounted to any of the faces of the hub 12 and in any orientation on any of the faces. The leg 238 includes various mounting holes 240 and can be alternatively curved.

The mounting holes 240 of the alternative connector 214 are in an embodiment the same hole diameter and in the same position as the mounting holes 140 of backing 56a and of the connector 14a and adapter 16a to which backing 56a is mounted. That is, the legs of the connector 14 and alternative connector 214 are the same and operate with mating components in the same manner. Further, the leg of the curved connector 114 (FIGS. 1 and 2) also includes holes of the same diameter and the same position as the legs of the connectors 14 and 214. Furthermore, the curved connector 114 can include either of the hole arrangements defined by the flange 36 of the connector 14 or the flange 236 of the connector 214.

Figure 7A:
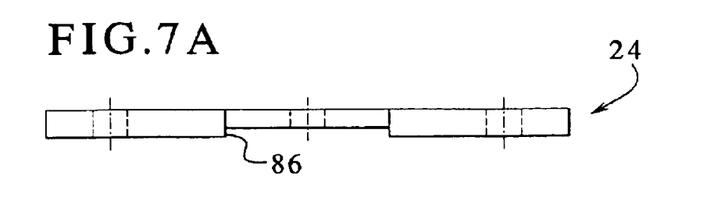
FIGS. 7A and 7B illustrate various views of a cross-brace member of the present invention.
Figure 7B:
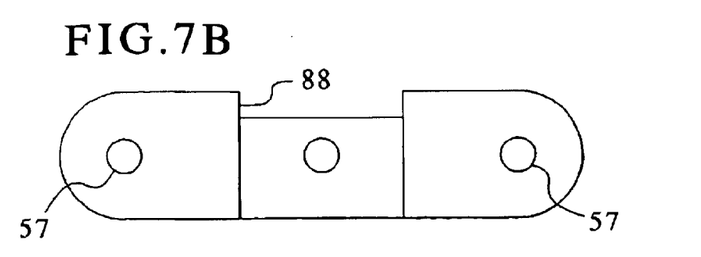

Referring now to FIGS. 7A and 7B, one embodiment of a cross-brace member 24 is illustrated. The cross-brace member 24 illustrated is of a type that extends above and below or from either side of the connector/adapter assembly. That is, the cross-brace member 24 defines two holes 57 that mount to the cross-brace adapter 84 illustrated above in FIG. 4. In an embodiment, the cross-brace member 24 defines a notch 86 as seen from the top view. The notch 86 enables the cross-brace member 24 to inset slightly onto one of the connectors 14, 114, 214, and 50. The notch provides stability to the system in that it prevents the cross-brace member 24 from rotating relative to the connector to which it is attached.

As seen in the front view of the cross-brace member 24, a notch 88 is also defined. FIGS. 3A and 4 illustrate that the cross-brace member 24 is positioned fairly close to the flanges 36, 52 and 352 of the connectors 14, 50 and 350, respectively. Notch 88 enables mounting screws 78 as seen in FIGS. 3A and 4 to clear the cross-brace member 24 and fasten the connectors 14, 50 and 350 to hub 12.

Figures 8A, 8B, 9A, 9B, 10A, 10B, 10C:
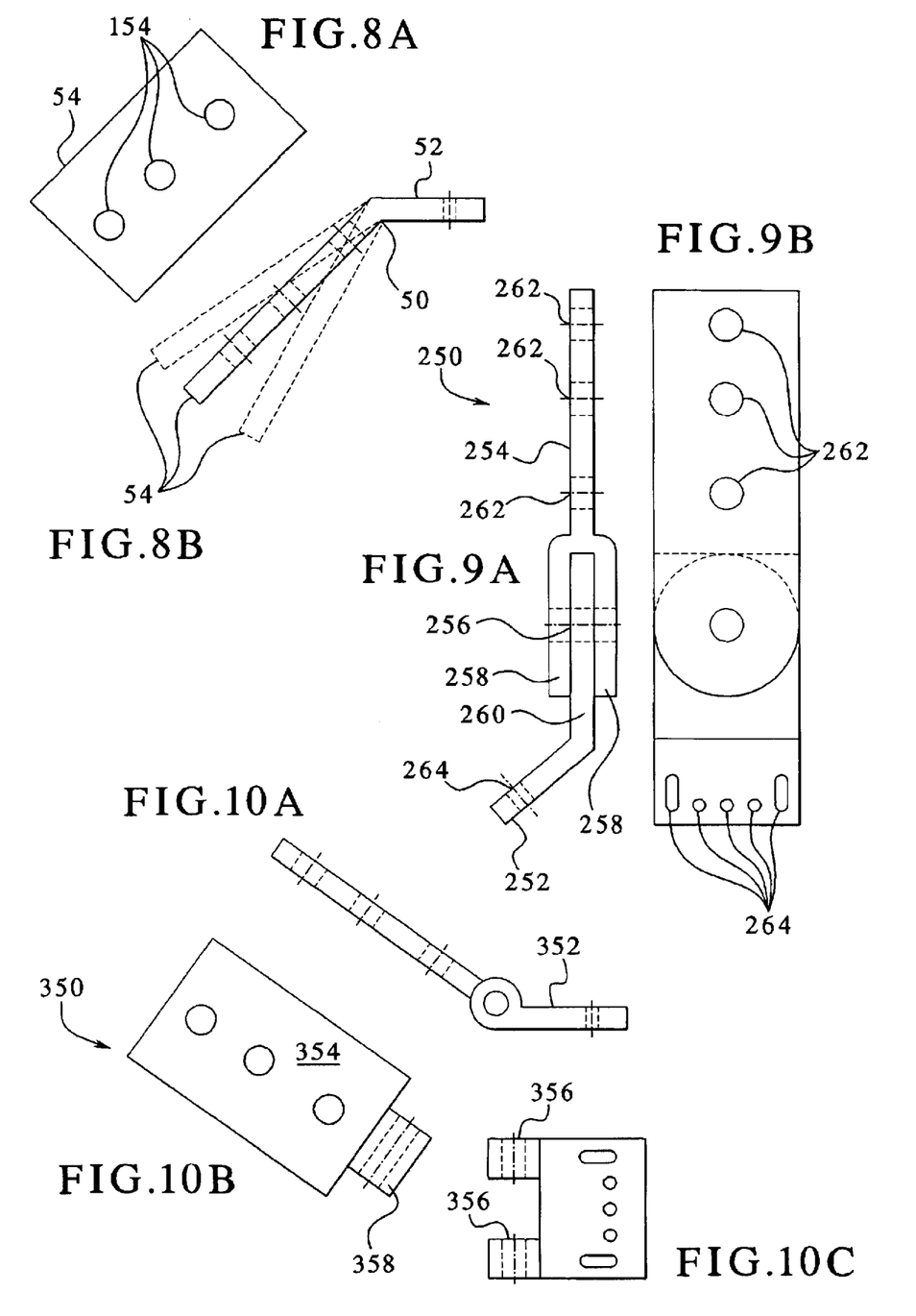
FIGS. 8A and 8B illustrate various views of a secondary connector of the present invention.
FIGS. 9A and 9B illustrate various views of a vertically pivoting secondary connector of the present invention.
FIGS. 10A to 10C illustrate various views of a horizontally pivoting secondary connector of the present invention.

Referring now to FIGS. 8A, 8B, 9A, 9B and 10A to 10C, various embodiments of the connectors of the present invention are illustrated. FIGS. 8A arid 8B illustrate the "L" shaped connector 50. The "L"shaped connector 50 includes a flange 52 and a leg 54. The leg 54 defines mounting holes 154 that, in an embodiment, are of the same size and same position as the mounting holes 140 of backing 56a and 240 of connector 214 illustrated in FIGS. 4 and 6 6A to 6C, respectively. FIGS. 8A and 8B illustrate that the same leg 54 can be fixed at various angles relative to the flange 52 of the "L" shaped connector 50.

FIGS. 9A and 9B illustrate a vertically pivoting alternative "L" shaped connector 250. When the flange 252 of the alternative connector 250 mounts to one of the faces of the hub 12, the alternative leg 254 rotates vertically with respect to hub 12 about pivot 256 defined by outer spokes 258 that are part of the leg 254 and by an inner spoke 260 which extends from flange 252. The outer spokes 258 are set apart slightly more than the width of the inner spoke 260, so that outer spokes 258 may rotate freely and vertically about the inner spoke 260. Mounting holes 262 defined by leg 254 are the same size and positioned in the same way as the mounting holes 140, 240, and 154 of the other connector legs illustrated herein. Furthermore, flange holes 264 defined by flange 252 are the same and are spaced apart the same as the holes 42 defined by the flange 36 illustrated in FIG. 2.

Referring now to FIGS. 10A to 10C, the component parts of horizontally rotating connector 350 previously discussed in connection with FIG. 3A are illustrated. In the illustrated embodiment, the flange 352 defines outer collars 356. The leg 354 is connected to an inner collar 358. The outer collars 356 are spaced apart enough to allow the inner collar 358 to be inserted between the outer collars 356. The collars 356 and 358 define similarly sized holes that allow a pin or screw to be inserted therethrough, so that the leg 354 can be rotated horizontally with respect to hub 12 in any desired direction. Leg 354 defines similarly sized and positioned holes as the other legs of the other connectors illustrated herein. Further, flange 352 defines similarly sized and positioned holes as the other flanges described herein.

Figure 11A:
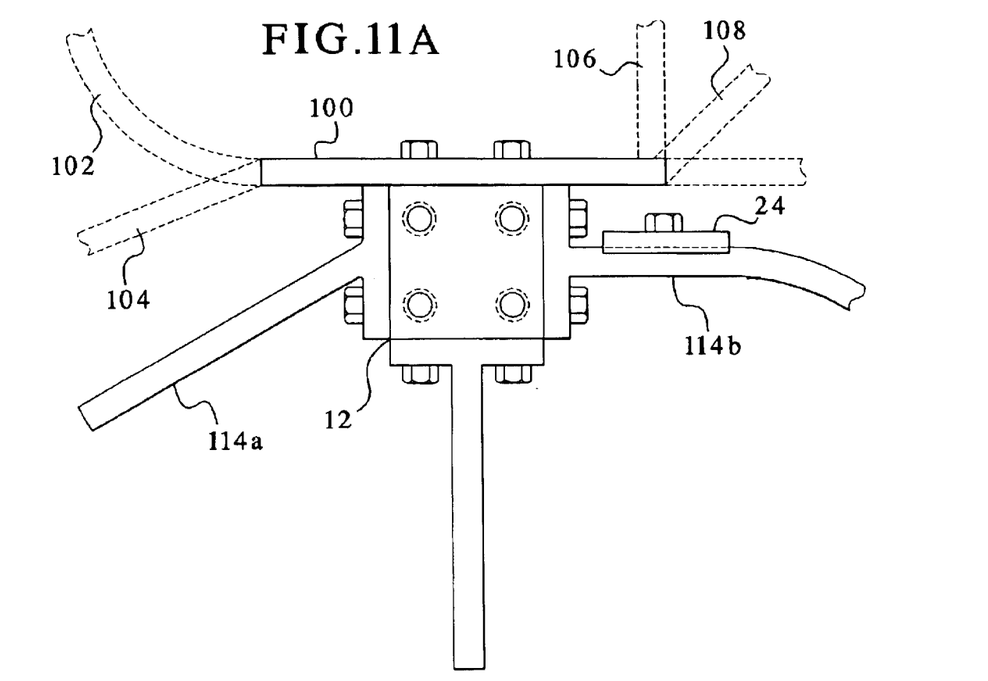
FIGS. 11A and 11B are elevation views of a hub having straight, curved and angled connectors attached thereto.
Figure 11B:
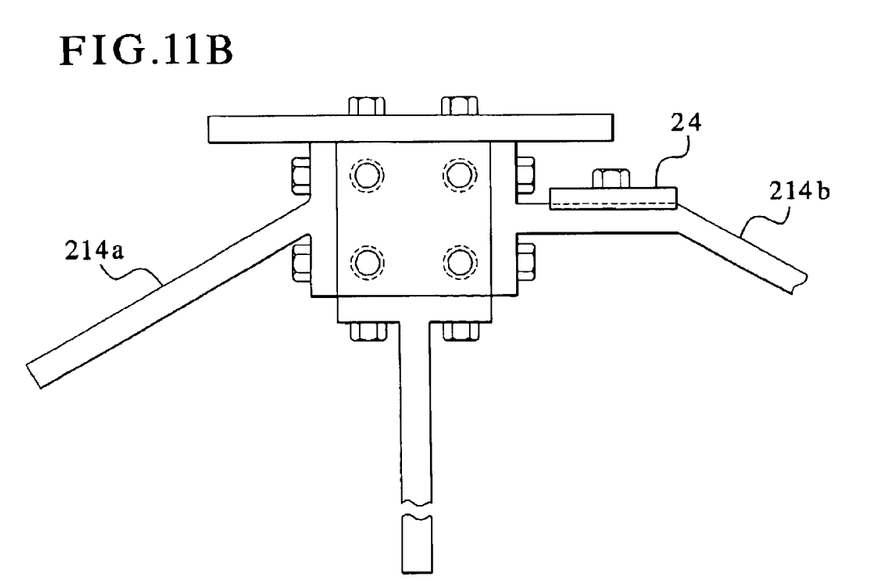

Referring now to FIGS. 11A and 11B, other alternative embodiments of the connectors of the present invention are illustrated. FIG. 11A illustrates a flat connector 100 that mounts to the top or bottom of the hub 12. The flat connector 100 can be bent or curved into various different shapes as illustrated by the alternative end portions 102 to 108 of flat connector 100. FIG. 11A also illustrates various embodiments of the curved connectors 114a and 114b. Curved connector 114b illustrates that it contains a flat section to which a cross-brace member 24 is attached.

FIG. 11B illustrates alternative angled connectors 214a and 214b. Angled connectors 214a and 214b can be rotated ninety degrees with respect to a hub 12, as can curved connectors 114a and 114b (FIG. 11A), so that the legs of these connectors are angled or curved horizontally or vertically. Similar to the curved connector 114b, angled connector 214b includes a straight section that allows a cross-brace member 24 to mount thereto.

Figure 12A:
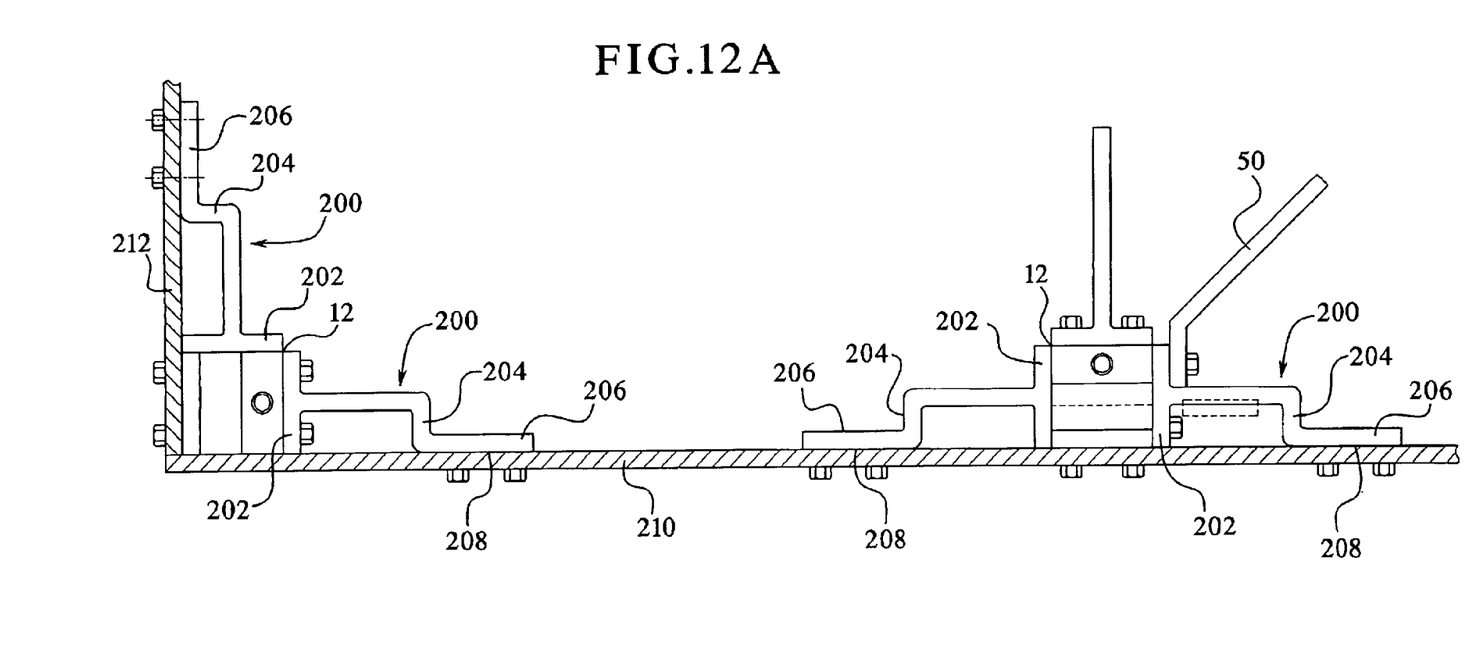
FIGS. 12A and 12B are top and front views, respectively, of alternative connectors of the present invention that are suitable for mounting and supporting panels.
Figure 12B:
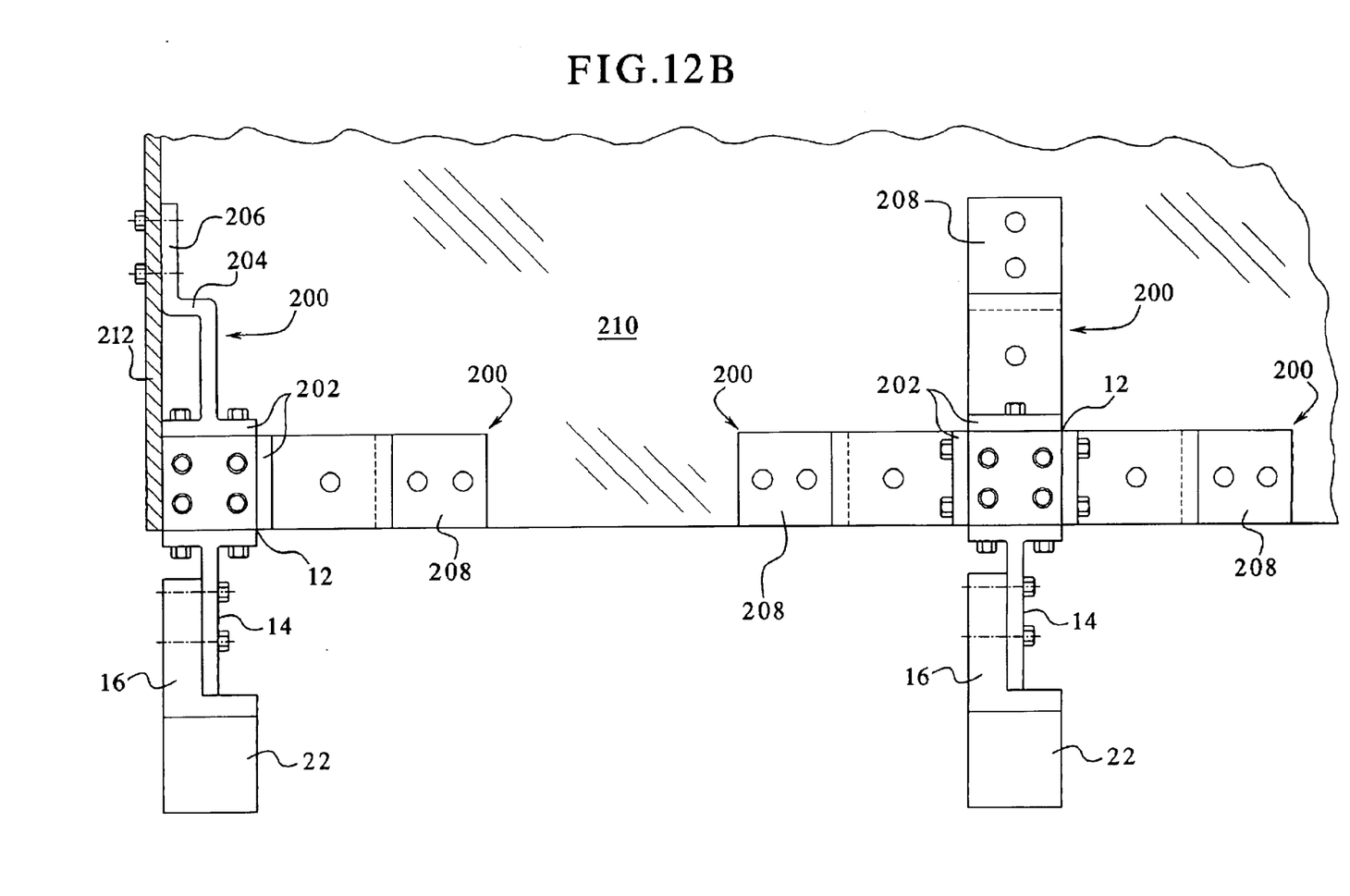

Referring now to FIGS. 12A and 12B, top and front views of alternative connectors 200 are illustrated, respectively. Alternative connectors 200 mount to the hubs 12 in the manners described above. The various "L" shaped curved, bent and rotatable connectors described above can mount to the flanges 202 of the alternative connectors 200. The alternative connectors 200 include a jog 204 and a the jogged leg 206 that provides a face 208 that is flush with one of the faces of the hub 12, The jogged face 208 provides a mounting area for a panel 210 shown in FIG. 12A and FIG. 12B. The panel 210 can be any sort of panel such as a metal panel, plastic or plexiglass panel, wood panel or any other type of display panel.

A panel 212 mounts on the side of the assembly shown in FIGS. 12A and 12B, behind the panel 210 as shown in FIG. 12A. As illustrated by the vertical view of FIG. 12B, panel 212 ends and does not extend below hubs 12. Connectors 14, adapters 16 and members 22 extend downwardly from the hubs 12, for example, to the floor to support the assembly having panels 210 and 212. Flanges 202 of alternative connectors 200, like the connectors described above, include mounting holes/slots that enable the connector 200 to mount to any face of hub 12, in any orientation, and extend horizontally or vertically therefrom.

It should be understood that various changes and modifications to the presently preferred embodiments described herein will be apparent to those skilled in the art. Such changes and modifications can be made without departing from the spirit and scope of the present invention and without diminishing its intended advantages. It is therefore intended that such changes and modifications be covered by the appended claims.

The invention is claimed as follows:

1. A structural connection system comprising:
   a hub having a plurality of pairs of opposing substantially flat faces;
   a connector having a flange connected to one of the faces of the hub, the face of the hub and the flange each including a plurality of mounting holes, the mounting holes of the hub and flange positioned and arranged so that the flange and connector can be mounted to the hub in a plurality of different orientations;
   an adapter connected to a leg extending from the flange of the connector; and
   a structural member connected to the adapter.

2. The structural connection system of claim 1, wherein the structural member is selected from the group consisting of: a tube, a channel, an angle, a beam and a formed member.

3. The structural connection system of claim 1, wherein at least one of the hub and the connector and the connector and the adapter are bolted together.

4. The structural connection system of claim 1, wherein the flange and the leg of the connector form a "T" shape.

5. The structural connection system of claim 1, wherein the connector is curved.

6. The structural connection system of claim 1, wherein the connector is angled.

7. The structural connection system of claim 1, wherein the leg of the connector rotates with respect to the flange of the connector.

8. The structural connection system of claim 1, wherein the connector is a first connector, and which includes a second connector having a jog that enables a panel to connect to a leg of the second connector and one of the faces of the hub.

9. The structural connection system of claim 1, which includes a cross-brace member connected to the connector.

10. The structural connection system of claim 9, wherein the cross-brace member includes a notch that prevents the cross-brace member from rotating with respect to the connector.

11. The structural connection system of claim 9, wherein the adapter is a first adapter and which includes at least one other adapter connected to the cross-brace member.

12. The structural connection system of claim 1, wherein the connector is a first connector and the adapter is a first adapter and which includes a second connector attached to a different one of the faces of the hub and a second adapter connected to the second connector.

13. The structural connection system of claim 12, wherein the structural member is a first structural member and which includes a second structural member is connected to the second adapter.

14. The structural connection system of claim 12, wherein the connector is a first connector and which includes a second connector attached to the same face of the hub as the first connector.

15. The structural connection system of claim 14, wherein the adapter is a first adapter and the member is a first member, and which includes a second adapter connected to the second connector, the second adapter connected to a second structural member.

16. The structural connection system of claim 14, which includes a cross-brace member connected to at least one of the first and second connectors and a third structural member connected to the cross-brace member.

17. The structural connection system of claim 14, wherein the second connector includes a leg bent from a flange of the second connector at an angle.

18. The structural connection system of claim 14, wherein the second connector includes a rotating portion.

19. The structural connection system of claim 1, which includes an insert positioned in an end of the structural member, the insert connected to the adapter.

20. A structural connection system comprising:
a hub having a plurality of pairs of substantially flat faces;
a first connector having a leg and a flange connected to one of the faces of the hub;
a second connector attached to the first connector and the hub;
a first structural member adapter connected to the leg of the first connector;
a second structural member adapter connected to the second connector; and
first and second structural members connected, respectively, to the first and second adapters.

21. The structural connection system of claim 20, wherein the second connector includes a flange that connects to the first connector and a leg that connects to the second adapter.

22. The structural connection system of claim 21, wherein the flange of the second connector is connected to the flange of the first connector.

23. The structural connection system of claim 20, which includes a third connector attached to the first connector and the hub.

24. The structural connection system of claim 23, wherein the second and third connectors each include a flange connected to the flange of the first connector.

25. The structural connection system of claim 20, wherein the second connector includes a component that rotates with respect to the hub.

26. The structural connection system of claim 20, wherein at least a portion of one of the first and second connectors is curved.

27. A structural connection system comprising:
first and second hubs each having a plurality of pairs of substantially flat faces;
a first connector including a flange mounted to one of the faces of the first hub and a leg extending from the flange;
a second connector including a flange mounted to one of the faces of the second hub and a leg extending from the flange of the second connector;
a first adapter connected to the first connector and a second adapter connected to the second connector; and
a structural member connected to the first and second adapters, wherein the member and the adapters are connectedly removable from the first and second connectors, and wherein the structural member is removable from the first and second hubs without moving the hubs.

28. The connection system of claim 27, which includes a third hub, the structural member being a first structural member and a second structural member connected to the first and third hubs.

29. The connection system of claim 28, wherein the first and second structural members are removable from the first, second and third hubs without moving the hubs.

30. The connection system of claim 28, wherein the second structural member is connected to another connector different than the first connector connected to the first hub.

31. The connection system of claim 27, which includes a cross-brace member connected to one of the legs of the first and second connectors.

32. The connection system of claim 31, wherein the cross-brace member is connected to a cross-brace, the cross-brace connected to a third hub.

33. The connection system of claim 32, wherein one of the structural and cross-brace members is curved.

34. A structural connection system comprising:
first and second hubs each having a plurality of pairs of substantially flat faces;
a first connector including a flange mounted to one of the faces of the first hub and a leg extending from the flange;
a second connector including a flange mounted to one of the faces of the second hub and a leg extending from the flange of the second connector, wherein at least one of the first and second hubs includes at least one multi-holed face having a plurality of mounting holes positioned so that the flange of an associated connector can be mounted to the multi-holed face in a plurality of different orientations; and
a structural member connected to the first and second connectors, wherein the member is removable from the connectors without moving the hubs.

35. The connection system of claim 34, the member is removable from the connectors, leaving the connectors attached to the hubs.

36. The connection system of claim 34, wherein the member is connected to first and second adapters, the first adapter connected to the first connector and the second adapter connected to the second connector.

37. The connection system of claim 34, wherein each of the faces of at least one of the first and second hubs is a multi-holed face having a plurality of mounting holes positioned so that the flange of an associated connector can be mounted to one of the multi-holed faces in a plurality of different orientations.

* * * * *